United States Patent [19]
Kobuchi et al.

[11] Patent Number: 5,404,700
[45] Date of Patent: Apr. 11, 1995

[54] HARVESTER FOR HEADED VEGETABLE

[75] Inventors: Toshiyuki Kobuchi; Touru Abe; Yasuo Misawa, all of Okayama, Japan

[73] Assignee: Kobashi Kogyo Co., Ltd., Okayama, Japan

[21] Appl. No.: 94,865

[22] Filed: Jul. 23, 1993

[30] Foreign Application Priority Data

| | | | |
|---|---|---|---|
| Jul. 30, 1992 | [JP] | Japan | 4-223235 |
| Sep. 18, 1992 | [JP] | Japan | 4-071552 U |
| Feb. 1, 1993 | [JP] | Japan | 5-036111 |
| Feb. 1, 1993 | [JP] | Japan | 5-036112 |
| Feb. 10, 1993 | [JP] | Japan | 5-045768 |
| Apr. 28, 1993 | [JP] | Japan | 5-102818 |
| Apr. 28, 1993 | [JP] | Japan | 5-102819 |

[51] Int. Cl.⁶ .................................... A01D 45/26
[52] U.S. Cl. .................. 56/327.1; 56/121.41
[58] Field of Search ............... 56/327.1, 327.2, 121.41, 56/121.42

[56] References Cited

U.S. PATENT DOCUMENTS

| | | | |
|---|---|---|---|
| 3,589,117 | 6/1971 | Wadsworth | 56/327.1 X |
| 3,731,477 | 5/1973 | Coon | 56/327.1 |
| 3,821,987 | 7/1974 | Shepardson et al. | 56/327.1 X |
| 3,827,503 | 8/1974 | Hansen | 56/327.1 X |
| 3,858,660 | 1/1975 | Wadsworth | 56/327.1 X |

Primary Examiner—Terry Lee Melius
Attorney, Agent, or Firm—Nikaido, Marmelstein, Murray & Oram

[57] ABSTRACT

A harvester has a supporting frame pivotally mounted on a body at a rear portion thereof, a hydraulic cylinder device for supporting the frame at an downwardly inclined position. A screw conveyer means comprising a pair of screw conveyers is rotatably supported on the frame. The screw conveyer device includes a pick up section for picking up capitate vegetables and a transfer section for transferring pickup vegetables to a rear portion of the screw conveyer device. A working section is provided at a rear portion of the body for treating picked up vegetables.

30 Claims, 12 Drawing Sheets

HARVESTER FOR HEADED VEGETABLE

BACKGROUND OF THE INVENTION

The present invention relates to a harvester for headed vegetables such as white cabbage, cabbage lettuce, and Chinese cabbage.

There has been proposed various harvesters for headed vegetables. For example, a conventional harvester has a pair of screw conveyers which picks up a cabbage growing on a field and convey it to a rear portion of the harvester. The root of the cabbage is cut off from the head. The treated cabbage is put in a container.

In the conventional harvester, the root may not be exactly cut off immediately below the head. Furthermore, there is a problem that the head may be easily injured.

SUMMARY OF THE INVENTION

An object of the present invention is to provide a harvester for headed vegetables which may eliminate the above mentioned disadvantages.

According to the present invention, there is provided a harvester for headed vegetables, having a body, a pair of crawlers for supporting and moving the body, and an engine for driving the crawlers through a transmission comprising a supporting frame pivotally mounted on the body at a rear portion thereof, a hydraulic cylinder device for supporting the frame at an downwardly inclined position, a screw conveyer device comprising a pair of screw conveyers rotatably supported on the frame, the screw conveyer device including a pickup section for picking up capitate vegetables and a transfer section for transferring picked up vegetables to a rear portion of the screw conveyer device, each of the screw conveyers comprising a plurality of screws, first driving means for driving each of the screws, and a working section provided at a rear portion of the body for treating picked up vegetables.

The other objects and features of this invention will become understood from the following description with reference to the accompanying drawings.

DETAILED DESCRIPTION OF THE PREFERRED EMBODIMENT

Figure 1:
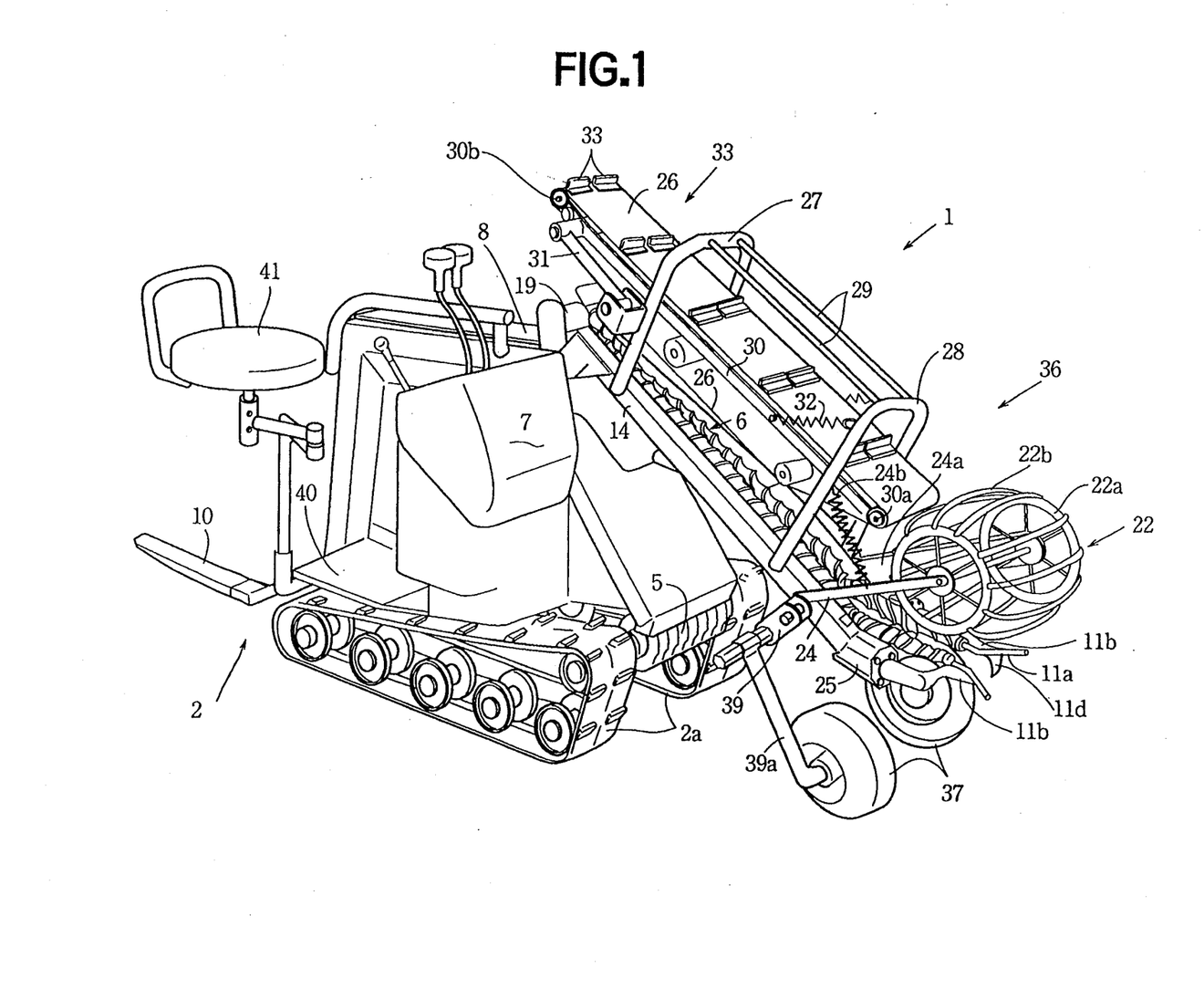
FIG. 1 is a perspective view showing a harvester according to the present invention.
Figure 2:
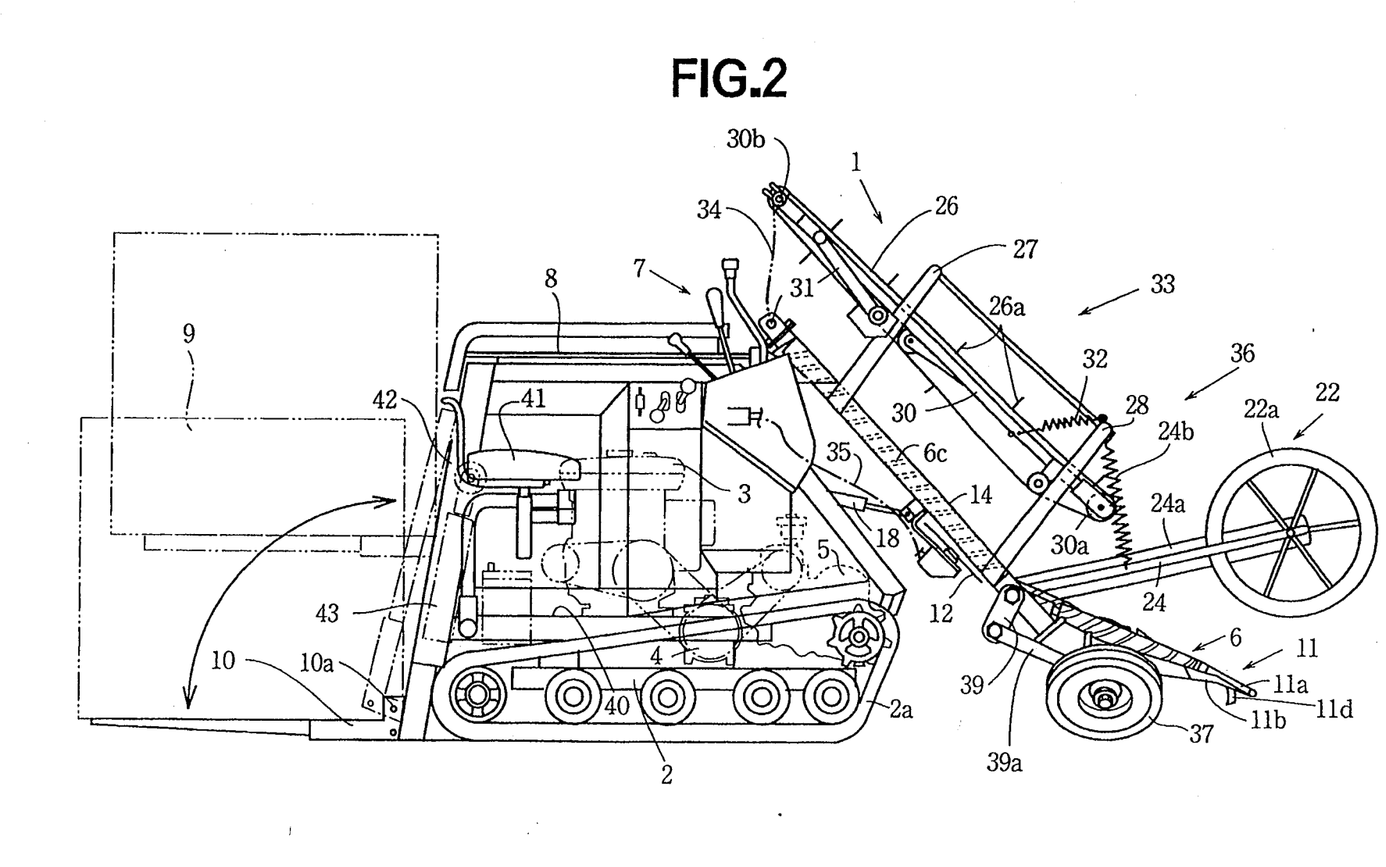
FIG. 2 is a side view of the harvester.
Figure 3:
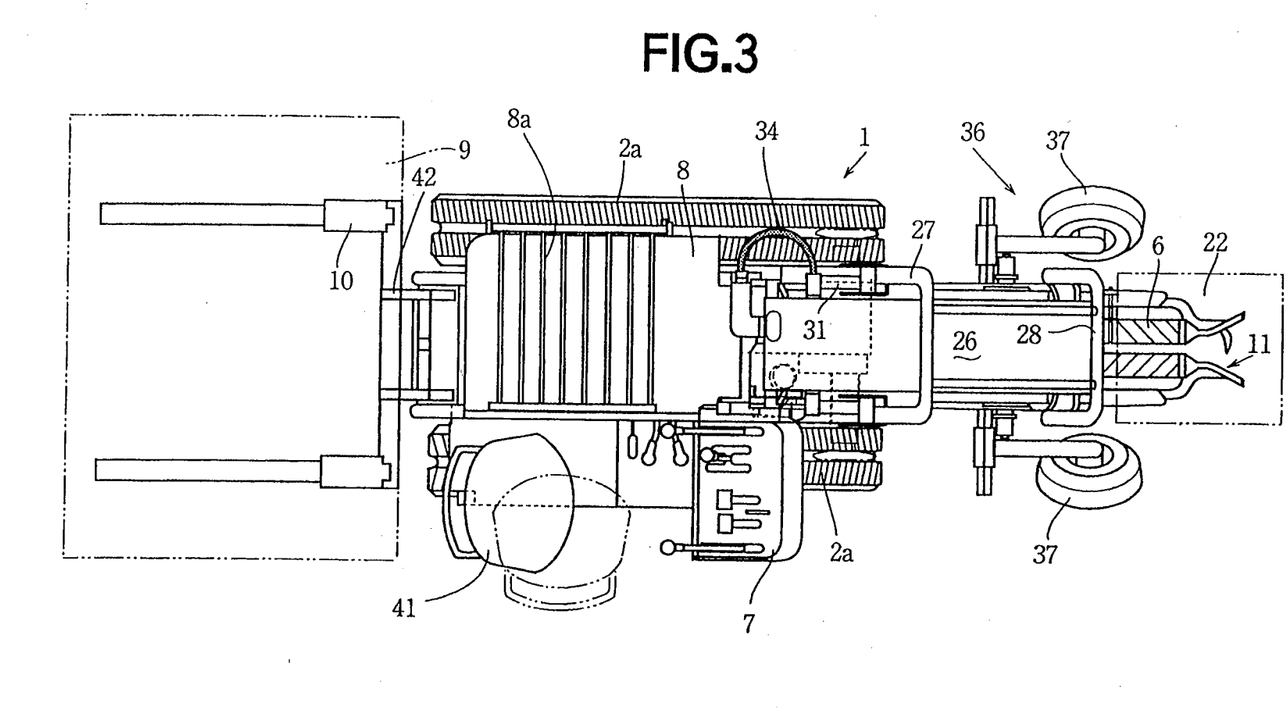
FIG. 3 is a plan view of the harvester.

Referring to FIGS. 1 to 3, a harvester 1 for picking headed vegetables according to the present invention has a body 2, and a pair of crawlers 2a provided under the body 2 on the opposite sides thereof for moving the body. An engine 3 is mounted on the body 2, at a central portion thereof. The power of the engine 3 is transmitted to the crawlers 2a and to other parts of the harvester 1 through a transmission 5.

The transmission 5 comprises a hydraulic continuously variable transmission (HST) an input shaft of which is connected to the engine 3 through a belt and pulley device, a speed change gear device, a pair of side clutches, a differential. The transmission is so arranged as to not only continuously transmit the power, but also discontinuously transmit the power. A brake system is operatively connected to the case of the differential. An oil pump 4 is further provided in the transmission 5.

An operating section 7 is provided on the body 2 beside the engine 3 for operating the harvester 1. Behind the operating section 7 a step 40 on which a driver stands is formed. A driver's seat 41 in the form of a stool is mounted on the step 40. The seat 41 is adapted to swivel in order that the facing direction of the drive may be changed while seated.

In front of the body 2, screw conveyer device 36 is mounted for picking up headed vegetables on the field and conveying them onto the harvester 1. The screw conveyer device 36 comprises a pair of screw conveyers 6 for picking up headed vegetables and transferring the picked headed vegetables, raking reel 22 for raking the head of the vegetable when picking, and a holding belt device 33 for holding the heads being conveyed.

Figure 5:
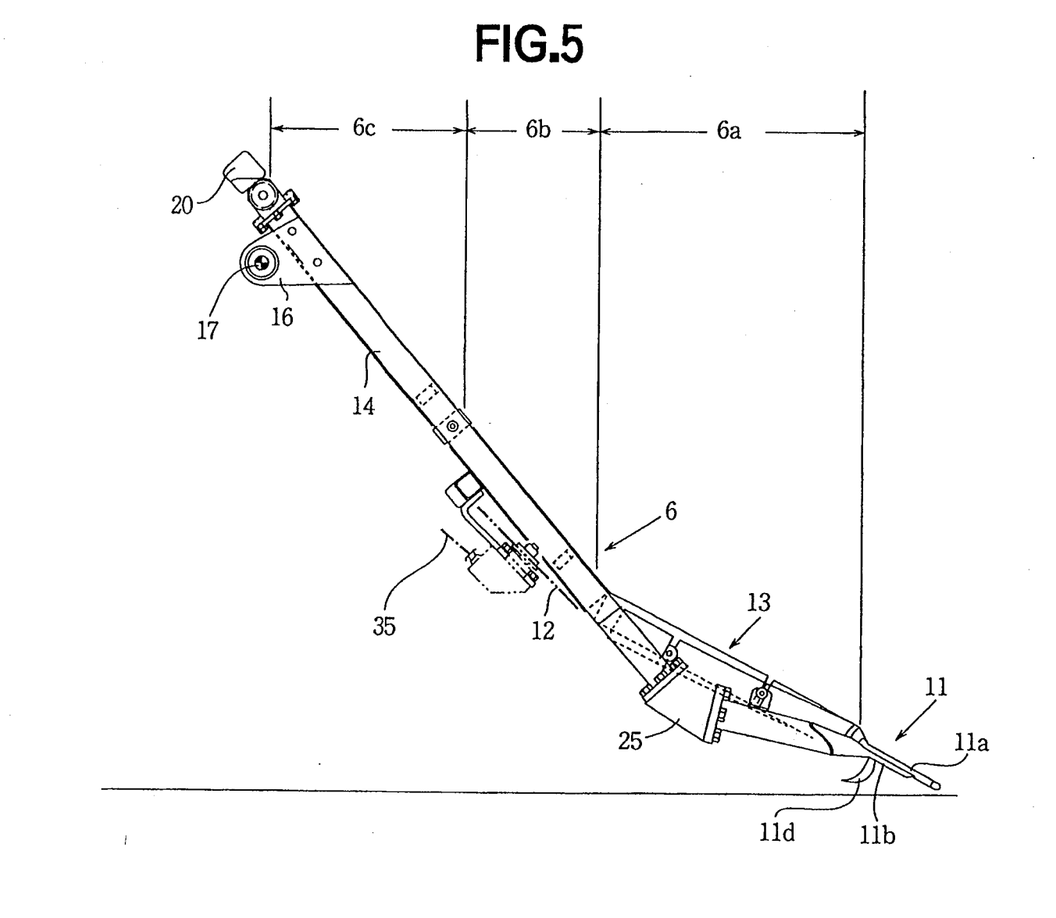
FIG. 5 is a side view showing a screw conveyer device.
Figure 6:
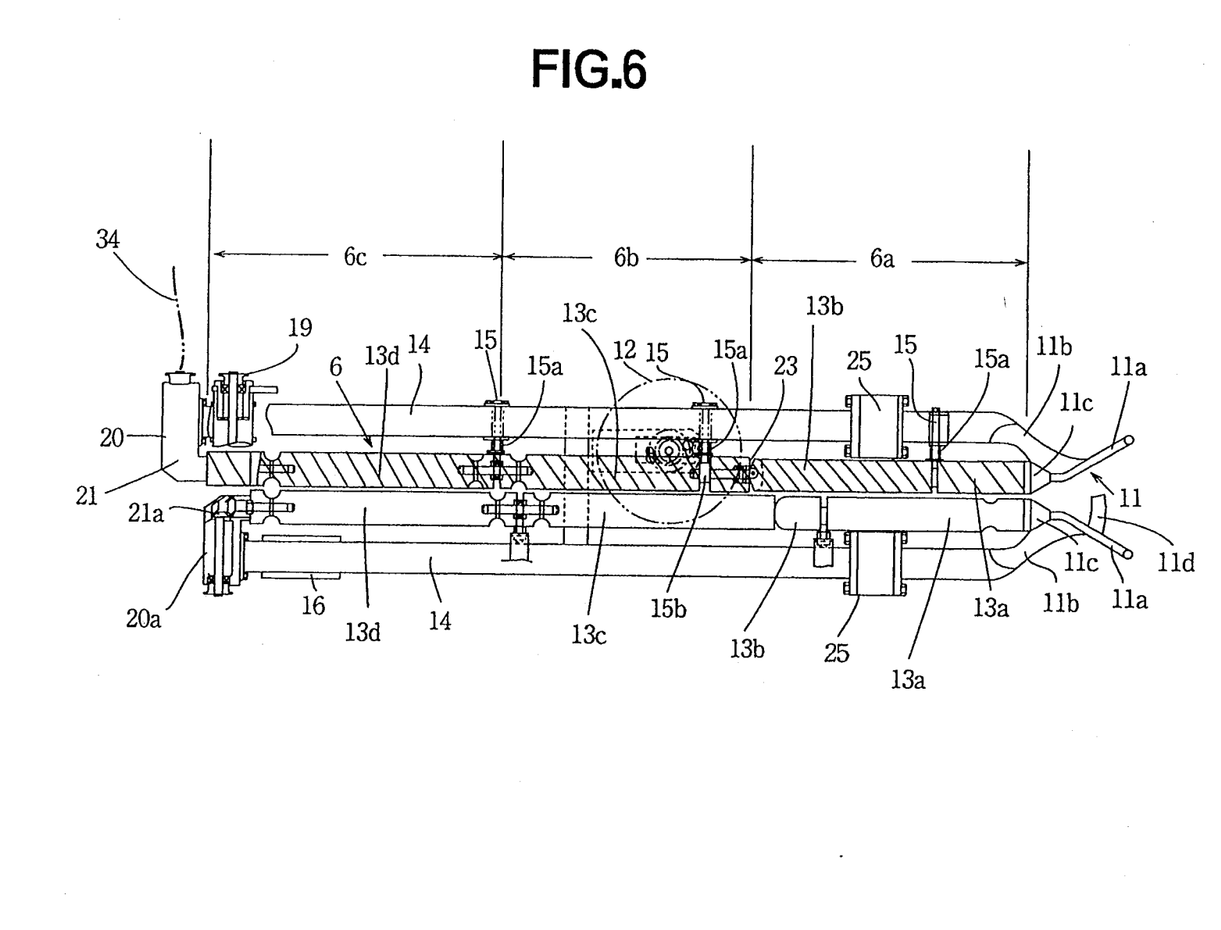
FIG. 6 is a plan view of the screw conveyer device.

Referring to FIGS. 5 and 6, the screw conveyer device 36 has a pair of downwardly inclined supporting frames 14. The frame 14 is bent at a joint 25 so as to extend along the screw conveyer. Each screw of the screw conveyers is attached to the corresponding frame 14. Each frame 14 has a pair of brackets 16 at the rear end thereof, which is pivotally mounted on the body 2 about a shaft 17. The frames 14 are further supported by a pair of retractable hydraulic cylinders 18 mounted on the body 2. Thus the screw conveyer 6 is adapted to be pivoted about the shaft 17 to raise and to lower the front end thereof in a vertical plane.

On the front end of each supporting frame 14 is formed a guide 11. The inclination of the guide 11 may be adjusted as appropriate.

Referring to FIG. 6, each guide 11 has a sweeper 11b for guiding the soil on the field to the right and left of the harvester 1, cap 11c mounted on the upper edge of the sweeper 11b, and a rod 11a projected from the cap 11c. The rods 11a are slanted outwardly in a V-shape. Further mounted on one of the guides 11 is a digger blade 11d which projects between the rods 11a for digging up the headed vegetables.

Each screw conveyer 6 is divided into four screws 13a, 13b, 13c and 13d so that each screw can be easily replaced when broken. The screw 13a which is rotatably mounted in the cap 11c of the guide 11 is connected to the screw 13b through a shaft, and the screw 13c is connected to the screw 13d also through a shaft. On the other hand, the screw 13b is connected to the screw 13c by way of a universal joint 23, so that the screws 13a and 13b may be inclined at a smaller angle as shown in FIG. 5. The screw pitch of the screw 13b is set to a smaller value than that of the rest of the screw, and the length of the screw of one of the screw conveyers is different from the corresponding screw of the other screw conveyer. The screws 13a and 13b form a pickup section 6a, the screw 13c, a first transfer section 6b, and the screw 13d, a second transfer section 6c, as indicated in FIG. 6.

Each of the screws is resiliently attached to the frame 14 by three shafts 15. More particularly, on the shafts provided between the screws 13a and 13b, screws 13b and 13c and a shaft extended from the universal joint 23 are rotatably mounted rings 15b. Each ring is connected to the shaft 15 which is securely mounted on the frame 14. A spring 15a is provided around each shaft 15 so that the distance between the screw conveyers 6 can be enlarged in accordance with the size of the conveying vegetable.

At a portion under the rear end of one of the frames 14 is provided a transmission device 19 connected to the transmission 5 mounted on the body 2. An output shaft of the transmission device 19 is connected to driving mechanisms 20 and 20a through chain devices. The driving mechanism 20 is connected to the rear screw 13d through a bevel gear device 21 to rotate it in a counterclockwise direction when seen from the front. The driving mechanism 20a is also connected to the other screw 13d through a bevel gear device 21a to drive the screw in the clockwise direction opposite to the corresponding screw. In operation, as the screws are rotated, the heads of vegetables dug up by the rods 11a of the guide 11 are carried upward on the screw conveyers 6 toward the operating section 7.

Referring to FIGS. 2 and 6, a rotary blade 12 for automatically cutting the roots of the vegetables being carried by the screw conveyers is mounted on the underside of one of the frames 14 adjacent the starting end of the first conveyer section 6b. The blade is rotated by the power of the engine 3 supplied from the transmission 5 through a flexible wire 35.

Referring to FIGS. 1 and 2, a pair of arches 27 and 28 are mounted on the frames 14 so as to support the holding belt device 33. The upper portions of the arches 27 and 28 are connected by a pair of parallel pipes 29. The holding belt device 33 comprises a frame 30 extending longitudinally in parallel to the screw conveyers 6 and an endless holding belt 26 running over the frame 30 for holding down the vegetables being conveyed on the screw conveyers 6. Pivotally connected to the inner leg of the rear arch 27 is an end of an link 31. The other end of the link 31 is pivotally connected to a rear end of the frame 30. The frame 30 is supported by a pair of springs 32 attached to the upper portion of the front arch 28. Thus, the distance between the belt and the screws is automatically changed depending on the size of the vegetables. The link 31 may be disposed at the front or the central portion of the frame 30.

The belt 26 has a plurality of rectangular flexible projections 26a disposed at a predetermined interval on the outer surface thereof. The projections may be omitted if not necessary.

The frame 30 has a front and rear rollers 30a and 30b which support the belt 26. The rear roller 30b is driven by the power transmitted from the driving mechanism 20 of the screw conveyer 6 through a flexible wire 34 as shown in FIG. 2. When the roller 30b is rotated, the lower portion of the belt 26 is driven rearwardly at the same speed as the screws, that is, at the traveling speed of the vegetables.

The raking reel 22 is mounted on the front portion of the frames 14 through a support arm 24 and a transmission case 24a, screw conveyer device 36. The raking reel 22 has a pair of wheels 22a, hubs which are rotatably supported on the support arm 24 and the transmission case 24a, and a plurality of resilient arcuated tubes 22b extended between the wheels 22a, thereby forming a cage. The support arm 24 and the transmission case 24a are supported by a pair of springs 24b attached to the front arch 28 of the holding belt device 33.

The transmission case 24a houses a chain device which transmits the engine power from the driving mechanism 20 of the screw conveyer 6 to the outer wheel 22a.

A pair of lateral connecting members 39 are secured to front portions of the frames 14. A ridge tracing wheel 37 is connected to each connecting member 39 through a downwardly extending rod 39a. The wheels 37 roll along opposite shoulder portions of a ridge of a field, so that the harvester 1 automatically traces the ridge of the field during the operation, thereby enabling the driver to work on the vegetables while the harvester is driven. The axle of each wheel 37 is outwardly inclined in a vertical plane as is the camber-angle. The distance between the wheels 37 may be controlled by adjusting the connecting member 39.

Behind the screw conveyer 6 is provided a worktable 8 on which the driver cuts the root of the vegetable. On the worktable is provided a grating 8a, which may be omitted as appropriate.

Figure 4:
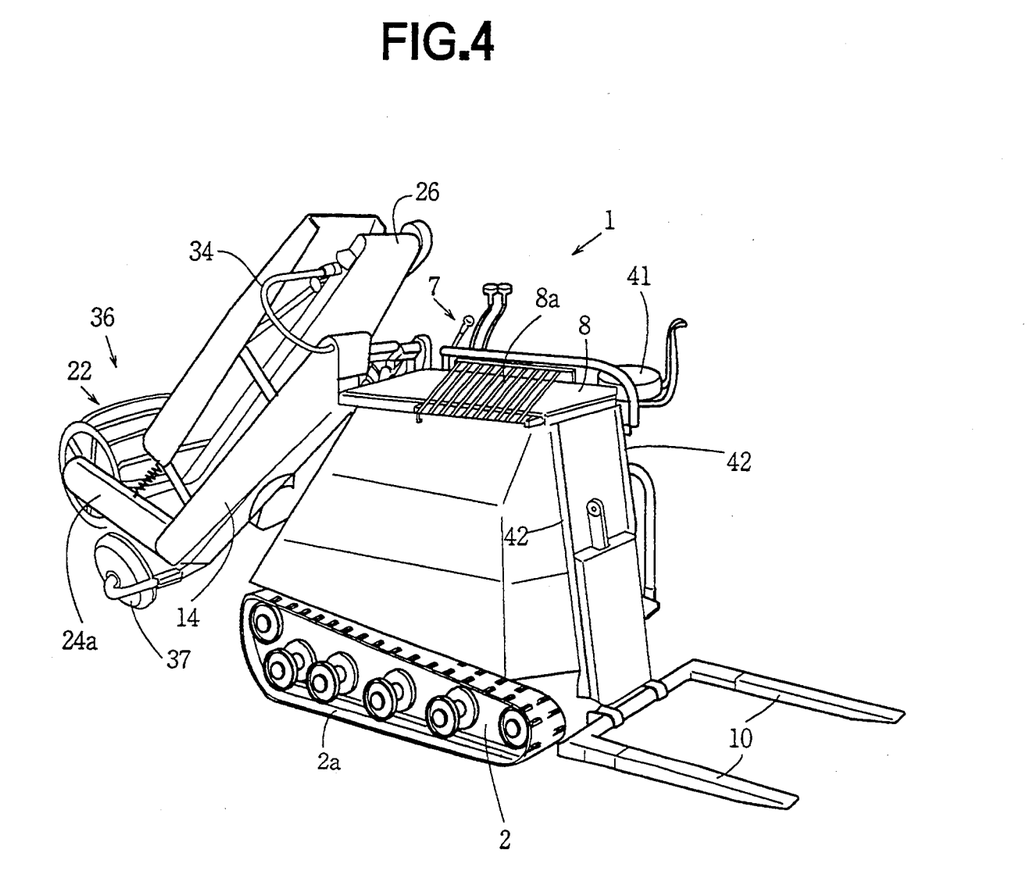
FIG. 4 is a perspective view as viewed from a back of the harvester.

Furthermore, as shown in FIGS. 2 and 4, at the rear of the worktable 8, a pair of vertically slanted rail 42 for supporting a forklift 10 is provided. The forklift 10 is connected to a hydraulic cylinder 43 (FIG. 2) through rollers and a chain device, so as to be vertically moved along a vertical groove formed in each rail 42. A large container 9, a capacity of which is about 200 kilograms, is adapted to be mounted on the forklift 10 so that the picked up vegetable may be kept therein. The forklift 10 is folded about a shaft 10a against the worktable 8 when not in use, as shown by a dot-dash line in FIG. 2.

Figure 7:
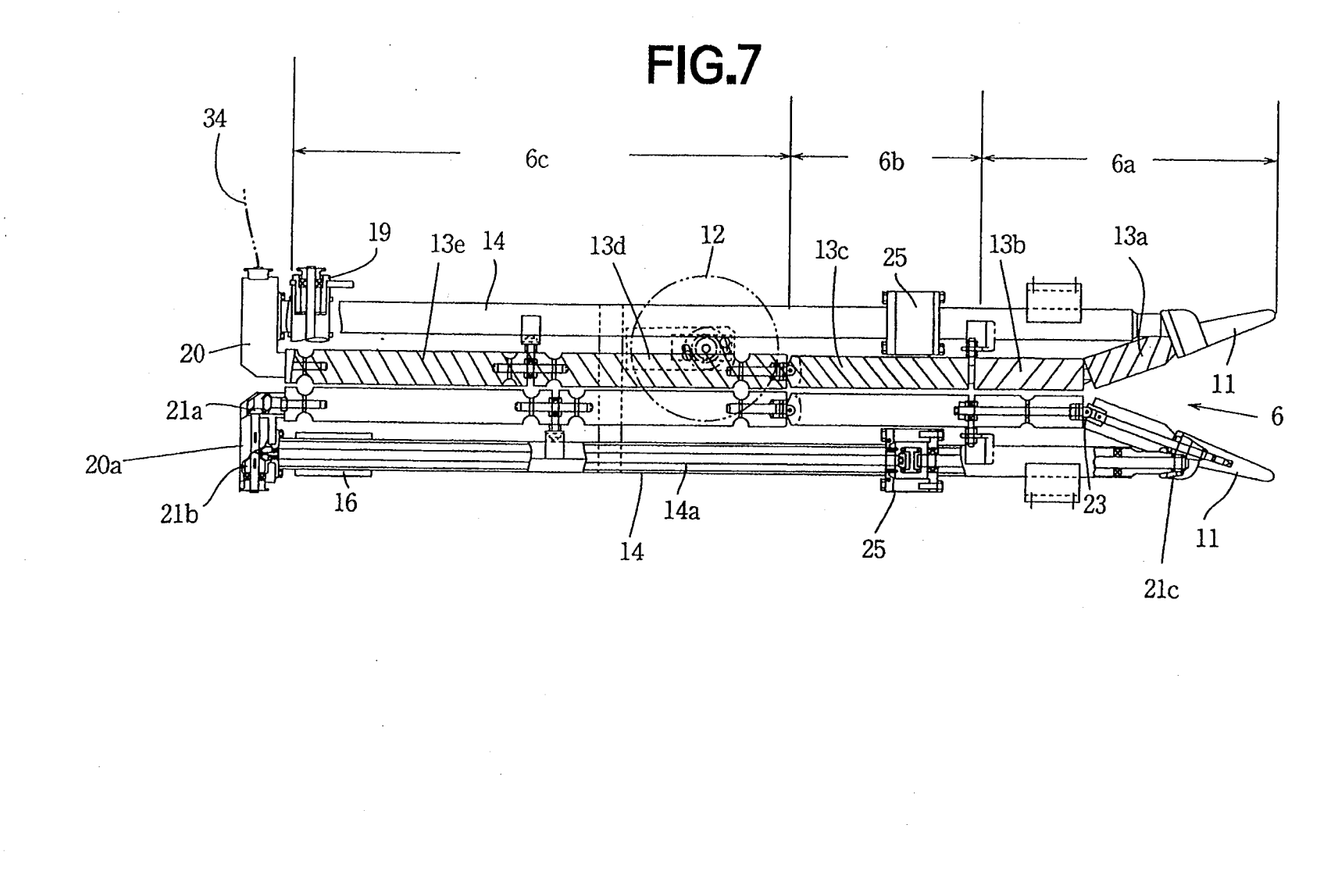
FIG. 7 is a plan view of a modification of the screw conveyer device.

Referring to FIG. 7 showing another example of the screw conveyers 6, each screw conveyer comprises five screws 13a to 13e. The screws 13a are opened in a V-shape. In each frame 14, a drive shaft 14a is rotatably mounted. The rear end of the drive shaft 14a is connected to the driving mechanism 20 (20a) through a bevel gear device 21b, and the front end is connected to the front end of the screw 13a through a bevel gear device 21c. Thus, the front end screw 13a is rotated by the driving mechanism 20 (20a).

Figure 8:
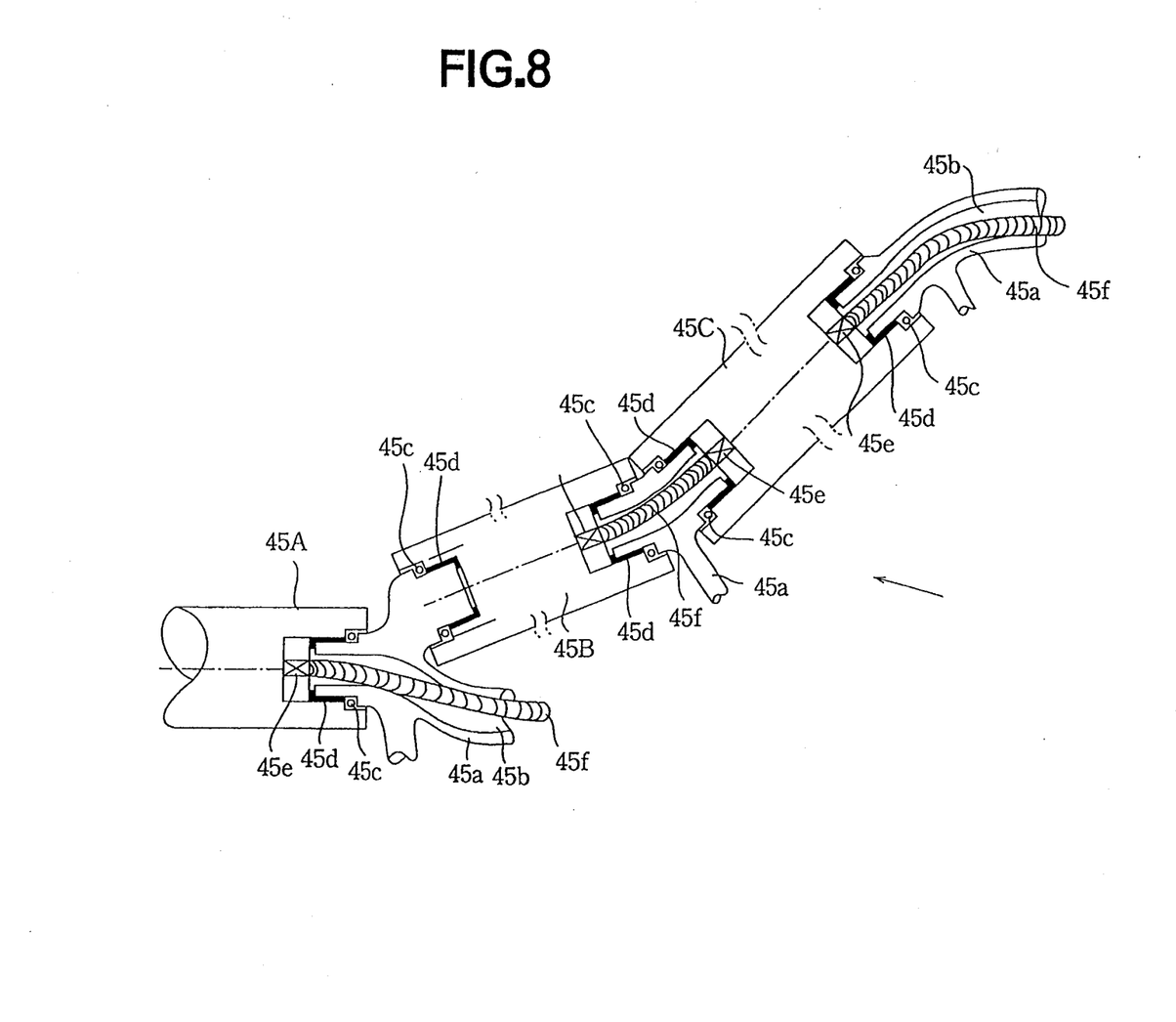
FIG. 8 is an explanatory view showing an example of the working seats.

Referring to FIG. 8, a modified screw 45 of the screw conveyer 6 comprises a pickup screw 45A, a first transfer screw 45B, and a second transfer screw 45C. Each screw has axial holes at the ends thereof.

A hollow supporting member 45a connected to the frame 14 of the screw conveyer 6 is supported in the rear end hole of the second transfer screw 45C through a thrust/radial bushing 45d and an O-ring 45c. The supporting member 45a has a hollow 45b in which a flexible tube 45f attached to the screw through a joint 45e is provided. The flexible tube 45f is supplied with power from the engine to rotate the second transfer screw 45C.

In order to rotatably connect the first transfer screw 45B to the second transfer screw 45C, the hollow supporting member 45a connected to the frame 14 of the screw conveyer 6 is rotatably supported in the holes of the screws 45B and 45C in the same manner as described hereinbefore. The flexible tube 45f is connected to the screws 45C and 45B through the joints 45e, thereby rotating the screw 45B.

In the hole of the pickup screw 45A is inserted the hollow supporting member 45a having branches. One of the branches, wherein the flexible tube is not provided, is inserted in the hole of the first transfer screw 45B and supported therein through the thrust/radial bushing 45d and the O-ring 45c, thereby connecting the screw 45A to the screw 45B.

In the other branch, the flexible tube 45f, which is supplied with the power of the engine, is provided and connected to the screw 45A. Thus, the pickup screw 45A is rotated independently of the first and second transfer screws 45B and 45C. Namely, the pickup screw 45A is rotated outwardly and the first and second transfer screws 45B and 45C are rotated inwardly. Furthermore, the pickup screw 45A is adapted to rotate faster than the screws 45B and 45C.

The operation of the harvester 1 is described hereinafter.

When driving the harvester 1 to a field, the hydraulic cylinder 18 is expanded so that the frame 14 of the screw conveyer 6 pivots upward about the shaft 17. Thus, the frames 14 and hence the guides 11 at the ends thereof are raised. At the same time, the ridge tracking wheels 37 are also raised, leaving the ground. As a result, the harvester 1 can be easily driven on the roads and fields by the crawlers 2a.

At the field where headed vegetables such as cabbages are to be harvested, the distance between the ridge tracking wheels 37 is adjusted to coincide with the width of the ridges. The hydraulic cylinder 18 is retracted, so that the ridge tracking wheels 37 are landed on the shoulder portions of the ridge and the rod 11a of the guide 11 and a front portion of the pickup screw 13a are inserted in the ground.

When the engine 3 is driven forward, the harvester 1 is driven on the crawlers 2a. At the same time, the screw convyers 6, holding belt device 26 and the raking reel 22 are also driven. The rods 11a hold a cabbage head by the roots thereof from both sides. As the harvester 1 moves forward, the digger blade 11d of the guide 11 provided between the rods 11a cuts off the roots and the sweepers 11b push away the soil from the guide 11. The raking reel 22 rakes in the head so that the head is pulled from ground and placed onto the screw 13. With the rotation of the screw conveyers 6, the cabbage head is further transferred upward on the screws toward the rear of the screw conveyer device 36. The projections 26a on the holding belt 26 of the holding device 33 helps to correct the postures of the cabbages and to transfer them rearward. The rotary blades 12 under the screw is also rotated, thereby automatically further cutting the roots of the cabbages held by the belt 26 at a predetermined position.

Since the wire 34 for transmitting power to the belt 26 is flexible, the holding belt device 33 can be moved in the vertical direction within a predetermined range in accordance with the size of the cabbages. The frames 14 of the screw conveyer device 36 is pivotally mounted on the shaft 17 so that the guide 11 can be moved in the vertical direction together with the ridge tracking wheels 37. Thus the harvester 1 can easily follow the ups and downs of the field, thereby enabling to effectively harvest the vegetables. The flexible wire 35 for transmitting power to the rotary blade 12 renders it possible for the screw conveyer device 36 to move in the vertical direction.

The head of the cabbage reaching the end of the screw conveyers falls on the worktable 8. The driver then cuts off the lower stem and outermost leaves of the head with a knife. The heads thus treated are thrown into the container 9 on the forklift 10 and the cut stems and leaves are thrown on the field.

At the start of the operation when the container 9 is empty, the forklift 10 is at a raised position, so that the vegetables are prevented from bruising when falling into the container. The forklift 10 is gradually lowered as the amount of treated heads in the container increases. Since the side rails 42 which support the forklift 10 are inclined, the center of gravity of the harvester 1 is maintained substantially at a center position although the rear portion thereof becomes heavier as the vegetables are picked.

During the harvesting, the ridge tracking 37 wheels roll on the sides of the ridge to automatically guide the body 2 along the ridge. When the harvester 1 reaches the end of the ridge, the driver operates to change the travelling direction thereof. Other than that, the driver serves as the worker for treating the picked vegetables. Thus, only one worker is needed for the harvesting operation.

When the container 9 becomes full of vegetables, the harvesting is temporarily stopped. The hydraulic cylinder 18 is expanded, thereby raising the screw conveyer device 36 and the ridge tracking wheels 37. The harvester 1 is then driven to the ridge or to a part of the field where the harvest is finished. The forklift 10 is lowered to unload the filled container 9 and to install an empty one. The harvester 1 is then driven off for another operation, while the vegetables are boxed for delivery by another worker.

Since the transmission 5 is disposed in front of the crawler 2, the engine 3, the operating section 7 and the worktable 8 at the center, and the forklift 10 at the rear, the harvester 1 is well balanced with respect to the lateral and longitudinal directions of the body. Accordingly, the driveability, steerability and stability, as well as the operability and efficiency of the harvester are improved. Furthermore, since the transmission 5 is disposed at the central portion of the body 2 with respect to the longitudinal length thereof, the harvester 1 can stably swivel with a minimum radius.

Figure 9:
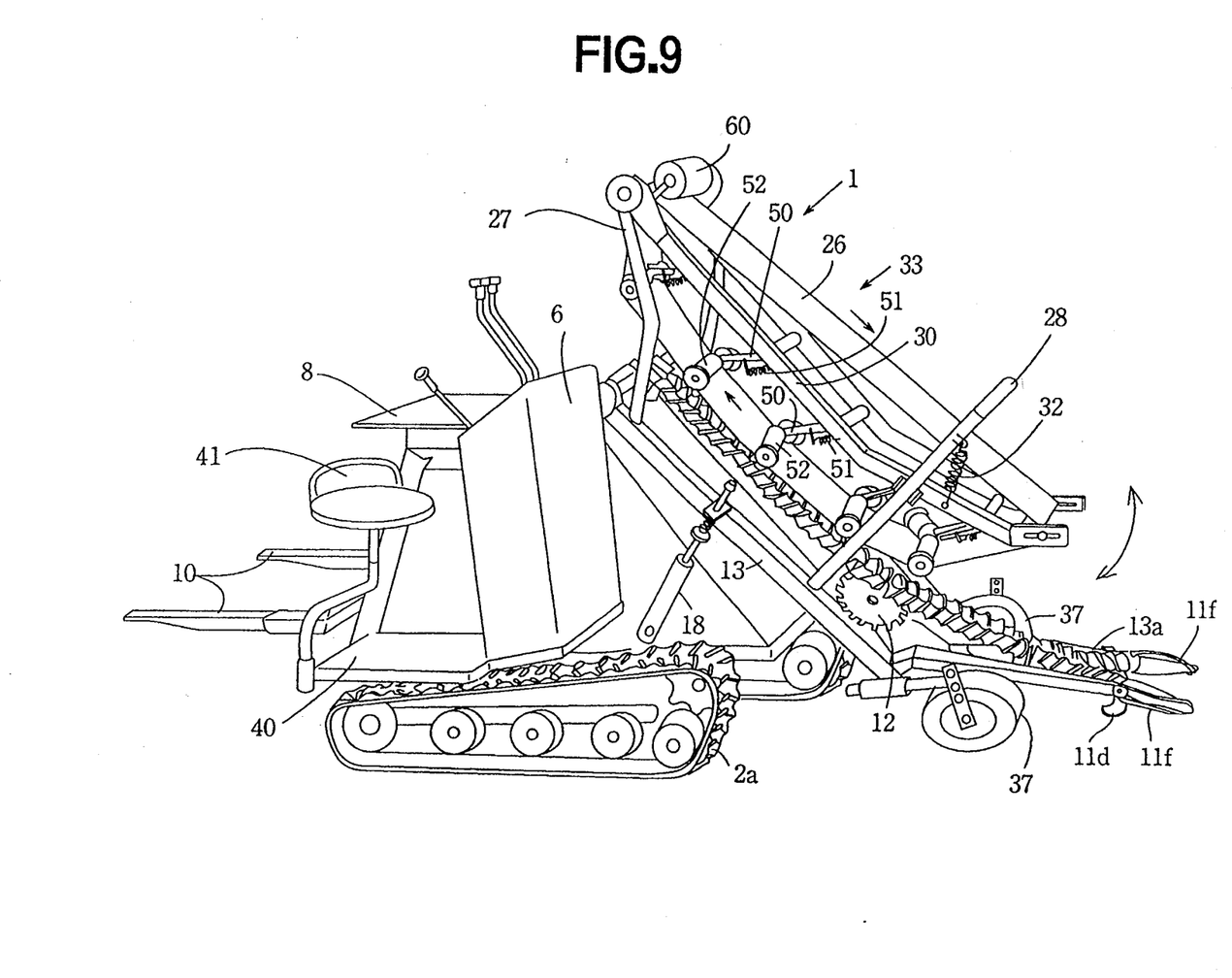
FIG. 9 is a perspective view showing a second embodiment of the present invention.

Referring to FIG. 9 showing the second embodiment, the same parts as the first embodiment are identified by the same reference numerals as the first embodiment.

In the holding belt device 33, a plurality of arms 50 are pivotally mounted on the frame 30, each of which is held by a spring 51. At a lower end of each arm 50, a pair of pressing rollers 52 are rotatably mounted. The rollers urge the lower running belt toward the screw conveyers 6 so as to hold headed vegetables being conveyed. The pressing rollers 52 are upwardly moved in accordance with the size of the vegetable.

Figure 10:
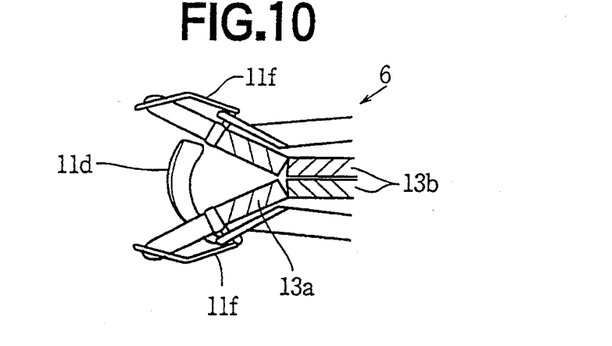
FIG. 10 is a plan view showing a front portion screw conveyer device of the second embodiment.
Figure 11:
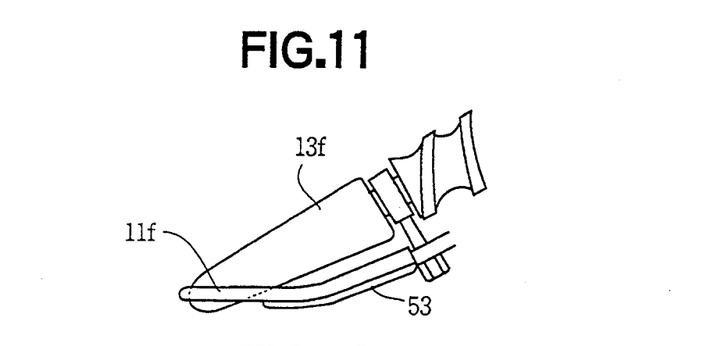
FIG. 11 is a side view showing a front portion of a screw conveyer.
Figure 12:
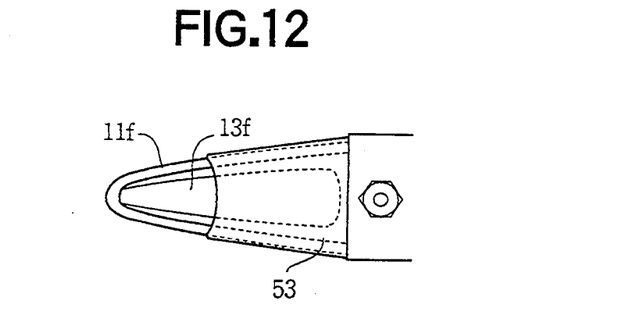
FIG. 12 is a plan view of the part of FIG. 11.

As shown in FIGS. 10 and 11, the screw 13a has a head 13f. A guide 11f is provided for preventing twisting of grass about the screws. A side plate 53 is attached adjacent the guide 11f for ensuring the preventing operation of the guide 11f. A sponge roller 60 is provided above the belt 26 for preventing soil from adhering to the belt.

Figure 13:
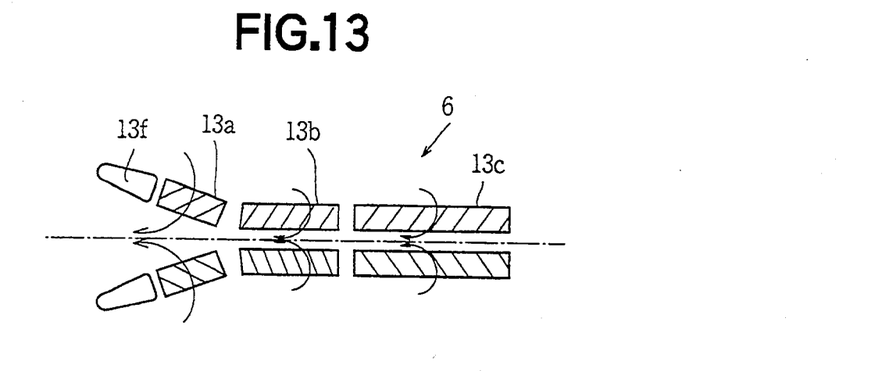
FIG. 13 is a schematic plan view showing the screw conveyer device.
Figure 14:
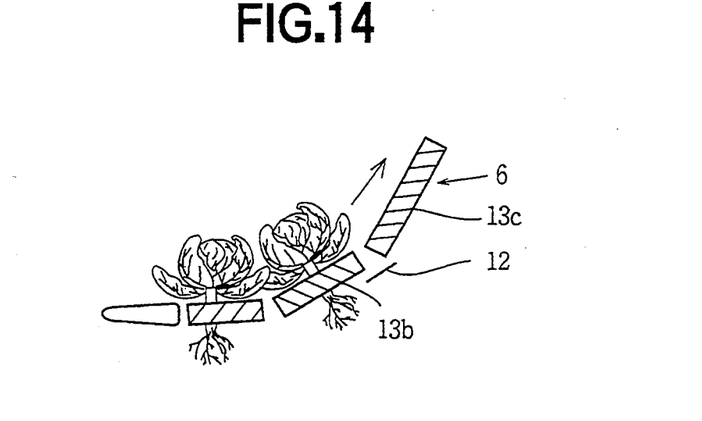
FIGS. 14 and 15 are explanatory views showing operation of the conveyer device.
Figure 15:
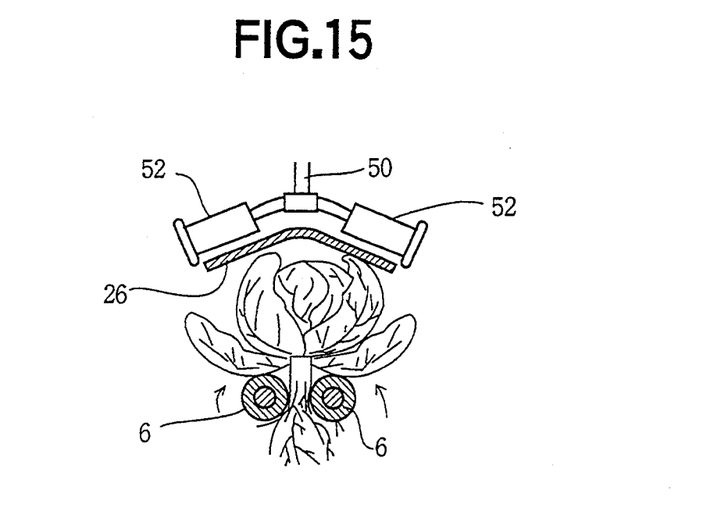
Figure 16:
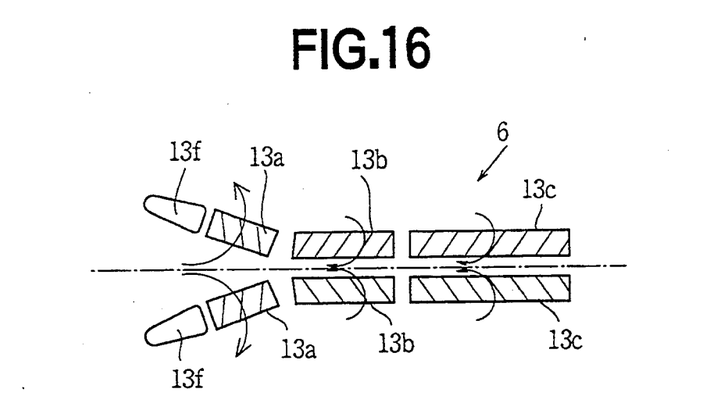
FIGS. 16 and 17 are examples of rotating direction.
Figure 17:
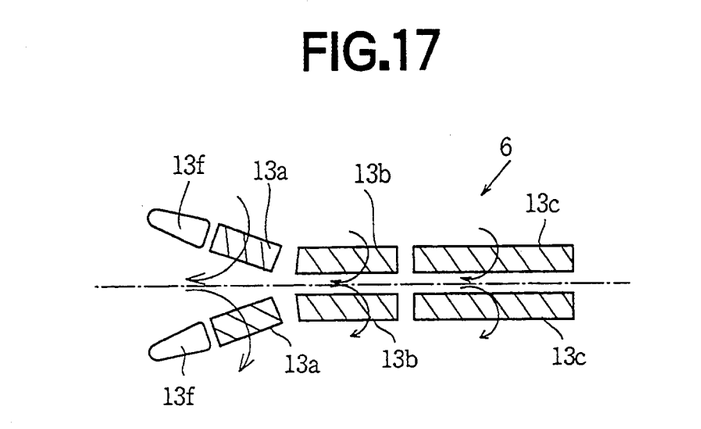
Figure 18:
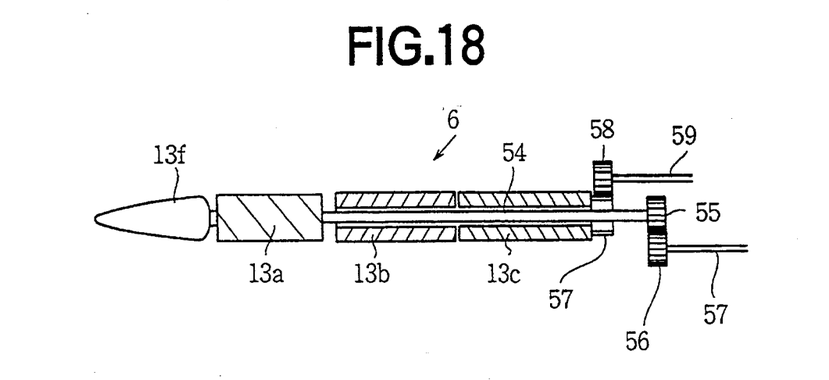
FIG. 18 is a sectional view showing a screw driving device.

FIGS. 13, 16, 17 show various rotating directions of the screw conveyers. FIG. 18 shows another example of screw driving system. The pickup screw 13a is driven by a shaft 54 rotatably mounted in the screws 13b and 13c and connected to the transmission through gears 55 and 56 and a shaft 57. Screws 13b and 13c are rotated by gears 57, 58 connected to the transmission through a shaft 59.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A harvester for harvesting headed vegetables comprising:
    a body,
    a pair of crawlers for supporting and moving the body,
    an engine for driving the crawlers through a transmission,
    a supporting frame pivotally mounted on the body at a rear portion thereof;
    a hydraulic cylinder device for supporting the frame at a downwardly inclined position;
    a screw conveyer means comprising a pair of screw conveyers, each of which comprises a plurality of screws, rotatably supported on the frame, which screw conveyer means includes:
        a pickup section for picking up capitate vegetables, and
        a transfer section for transferring picked up vegetables to a rear portion of the screw conveyer device;
    first driving means for driving each of the screws;
    a working section provided at a rear portion of the body for treating picked up vegetables, and
    an operative device provided adjacent said working section for operating said harvester.

2. The harvester according to claim 1 further comprising a container provided adjacent the working section for receiving treated vegetables.

3. The harvester according to claim 1 further comprising a blade for cutting a root of a headed vegetable being transferred by the screw conveyer device.

4. The harvester according to claim 1 further comprising a holding belt device having an endless belt provided above the transfer section of the screw conveyer device.

5. The harvester according to claim 1 further comprising a pair of wheels provided on opposite sides of the pickup section of the screw conveyer device so as to trace a ridge of a field.

6. The harvester according to claim 1 further comprising a lift provided for lifting the container.

7. The harvester according to claim 1 further comprising a digger blade provided below the pickup section for digging up the headed vegetables.

8. The harvester according to claim 1 further comprising a second driving means for driving said blade and said belt of the holding belt device.

9. The harvester according to claim 1 wherein said first driving means is provided for independently driving the screws of the pickup section and the screws of the transfer section.

10. The harvester according to claim 1 wherein said transfer section is inclined at a larger angle than the pickup section.

11. The harvester according to claim 1 wherein the length of the screw of one of the screw conveyers is different from that of a corresponding screw of the other screw conveyer.

12. The harvester according to claim 1 wherein the inclination angle of the screw of one of the screw conveyers is different from that of a corresponding screw of the other screw conveyer.

13. The harvester according to claim 1 wherein at least one of the screw conveyers is supported on the supporting frame by means of resilient means.

14. The harvester according to claim 1 wherein said screws of each of the screw conveyers are operatively connected with each other, and a first driving means is provided for driving each of the screw conveyers at a rear end thereof.

15. The harvester according to claim 1 further comprising a raking reel provided above the pickup section for raking the headed vegetables.

16. The harvester according to claim 1 wherein the opposite screws of the pickup section are opened in a V-shape.

17. The harvester according to claim 1 further comprising a pair of guides provided to be projected from the front of the pickup section in a V-shape.

18. The harvester according to claim 1 wherein said engine is disposed at a central portion of the body, said transmission is disposed at a front portion of the body, and said working section is disposed at a side portion of the body.

19. The harvester according to claim 1 wherein the screw of the transfer section is operatively connected to the first driving means at a rear end thereof, and the screw of the pickup section is operatively connected to the first driving means at a front portion thereof so as to be driven, respectively.

20. The harvester according to claim 1 wherein screws of the pickup section and the transfer section are different from each other in pitch so as to change the transferring speed.

21. The harvester according to claim 4 wherein the holding belt device is pivotally mounted on the body at a rear end portion thereof.

22. The harvester according to claim 4 wherein the belt of the holding belt device has a plurality of raking projections.

23. The harvester according to claim 4 further comprising a plurality of pressing rolls for urging the belt of the holding belt device toward the screw conveyer device.

24. The harvester according to claim 4 wherein the holding belt device is supported so as to be vertically moved.

25. The harvester according to claim 4 wherein the holding belt device is supported by a spring at a front portion thereof, and connected to the body through a link at a rear portion thereof.

26. The harvester according to claim 5 wherein each of the wheels is provided to be adjusted in vertical position.

27. The harvester according to claim 8 wherein the second driving means includes flexible wires for driving the blade and the belt.

28. The harvester according to claim 15 wherein the raking reel comprises opposite circular wheels and a plurality of resilient tubes provided between the circular wheels.

29. The harvester according to claim 17 further comprising a side plate provided at a side of each of the guides.

30. The harvester according to claim 19 wherein a part of the first driving means for driving the screws of the pickup section is provided in the supporting frame.

* * * * *